(12) United States Patent
Lindenthal et al.

(10) Patent No.: US 6,923,726 B1
(45) Date of Patent: Aug. 2, 2005

(54) ARTICULATED YOKE, METHOD FOR THE PRODUCTION OF A SUPPORTING SURFACE ENABLING AN EVEN DISTRIBUTION AND BEARING ARRANGEMENT

(75) Inventors: Hans Lindenthal, Heidenheim (DE); Peter Grawenhof, Niederstotzingen (DE)

(73) Assignee: Voith Turbo GmbH & Co., KG, (DE)

( * ) Notice: Subject to any disclaimer, the term of this patent is extended or adjusted under 35 U.S.C. 154(b) by 0 days.

(21) Appl. No.: 09/830,308
(22) PCT Filed: Aug. 23, 2000
(86) PCT No.: PCT/EP00/08232
§ 371 (c)(1), (2), (4) Date: Apr. 25, 2001
(87) PCT Pub. No.: WO01/14757
PCT Pub. Date: Mar. 1, 2001

(30) Foreign Application Priority Data

Aug. 25, 1999 (DE) ............................ 299 14 893 U
Nov. 9, 1999 (DE) ............................... 199 53 963

(51) Int. Cl.[7] .............................................. F16D 3/40
(52) U.S. Cl. ....................... 464/132; 464/134; 384/584
(58) Field of Search ............................... 464/127, 132, 464/134, 135, 136; 29/527.6, 898.06, 898.066, 29/DIG. 26; 384/584

(56) References Cited

U.S. PATENT DOCUMENTS

| | | | | |
|---|---|---|---|---|
| 1,159,645 A | * | 11/1915 | Brown | 29/898.066 X |
| 1,269,808 A | * | 6/1918 | Gray et al. | 29/898.066 |
| 1,700,991 A | * | 2/1929 | Wintercorn | 464/135 X |
| 4,412,827 A | | 11/1983 | Petrzelka et al. | 464/128 |
| 4,512,679 A | * | 4/1985 | Petrzelka et al. | 464/132 X |
| 4,541,818 A | * | 9/1985 | Olschewski et al. | 464/134 |
| 4,574,361 A | | 3/1986 | Inagawa et al. | 464/135 |
| 4,880,405 A | | 11/1989 | Ende | 464/14 |
| 5,868,625 A | * | 2/1999 | Heier et al. | 464/132 X |
| 6,089,758 A | * | 7/2000 | Ward | 384/584 X |
| 2001/0042307 A1 | * | 11/2001 | Nolden | 29/898.066 |

FOREIGN PATENT DOCUMENTS

| | | | |
|---|---|---|---|
| DE | 3446495 | 7/1986 | |
| DE | 3544253 | 6/1987 | |
| SU | 1284-804 | * 1/1987 | 29/DIG. 26 |

OTHER PUBLICATIONS

Machinery's Handbook, 25th ed. New York, International Press, 1996. p. 139, TJ151.M3 1996.*

Offprint, Voith, Forschung und Konstruktion (Research and Design), vol. 33 (1989, Essay 10, "Entwicklung wälzgelagerter Gelenkwellen für Hauptantriebe schwerer Walzgerüste"[Development of roller-mounted universal-joint propeller shafts for the main drives of heavy roll spans]).

* cited by examiner

Primary Examiner—Greg Binda
(74) Attorney, Agent, or Firm—Ostrolenk, Faber, Gerb & Soffen, LLP

(57) ABSTRACT

The invention relates to a yoke (4) which is used in universal-joint propeller shafts, having at least one leg member (7) which is connected to an input or output part of a machine element comprising at least one bearing part (8) surrounding a bore (9). Said bore (9) forms a supporting surface (10) at least one partial zone of a roller-bearing arrangement (11) for the positioning of a journal (6) of a differential-pinion shaft (3). The invention is characterized in that the supporting surface has at least one local recess (20) in the region of the rolling elements (14)) of the roller-bearing arrangement (11) which is subjected to maximum tensile stress during the transmission of the torque.

13 Claims, 5 Drawing Sheets

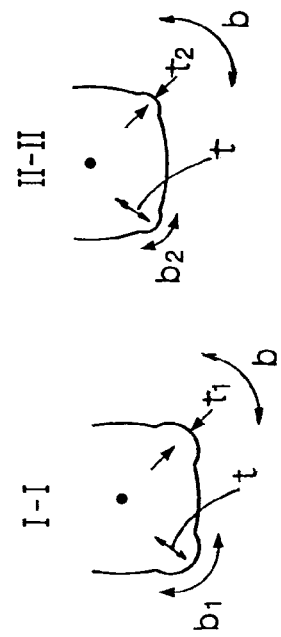
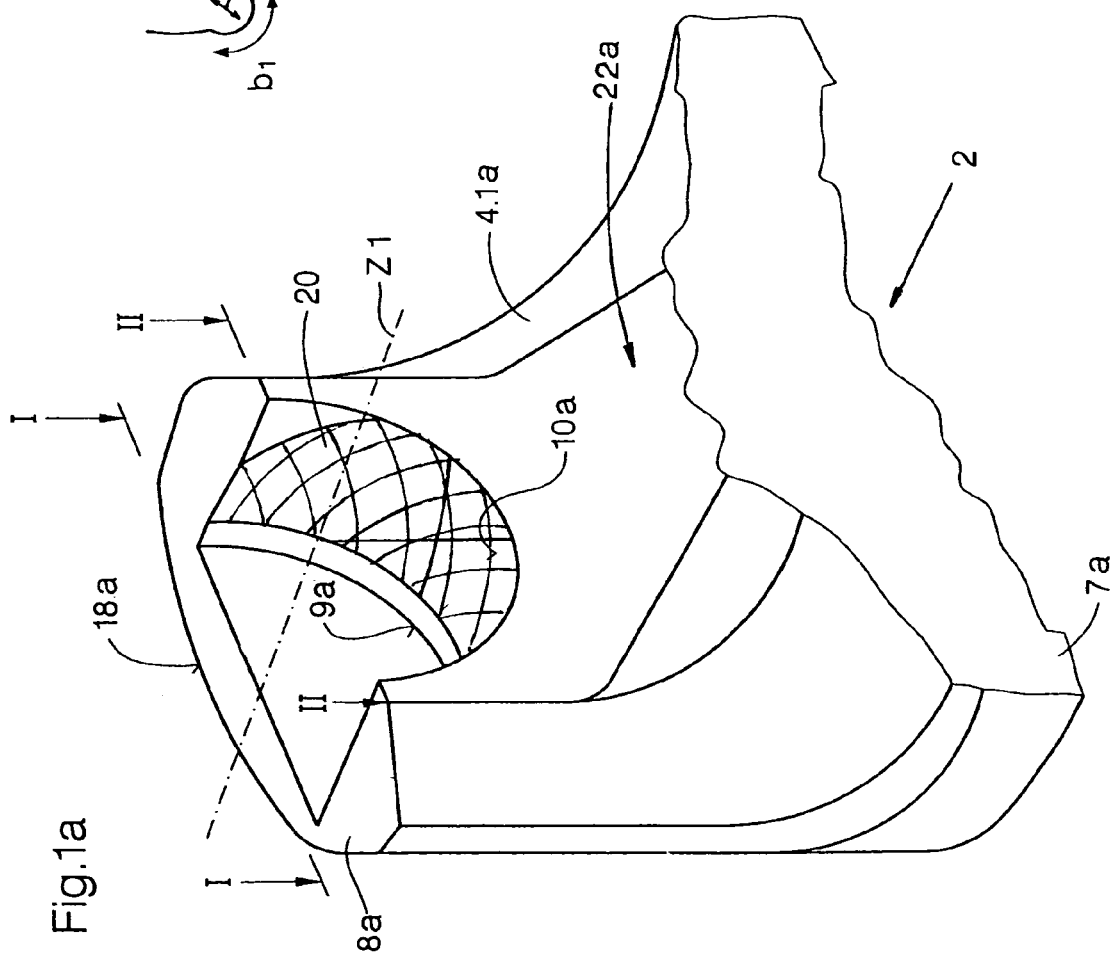

Fig.2a1
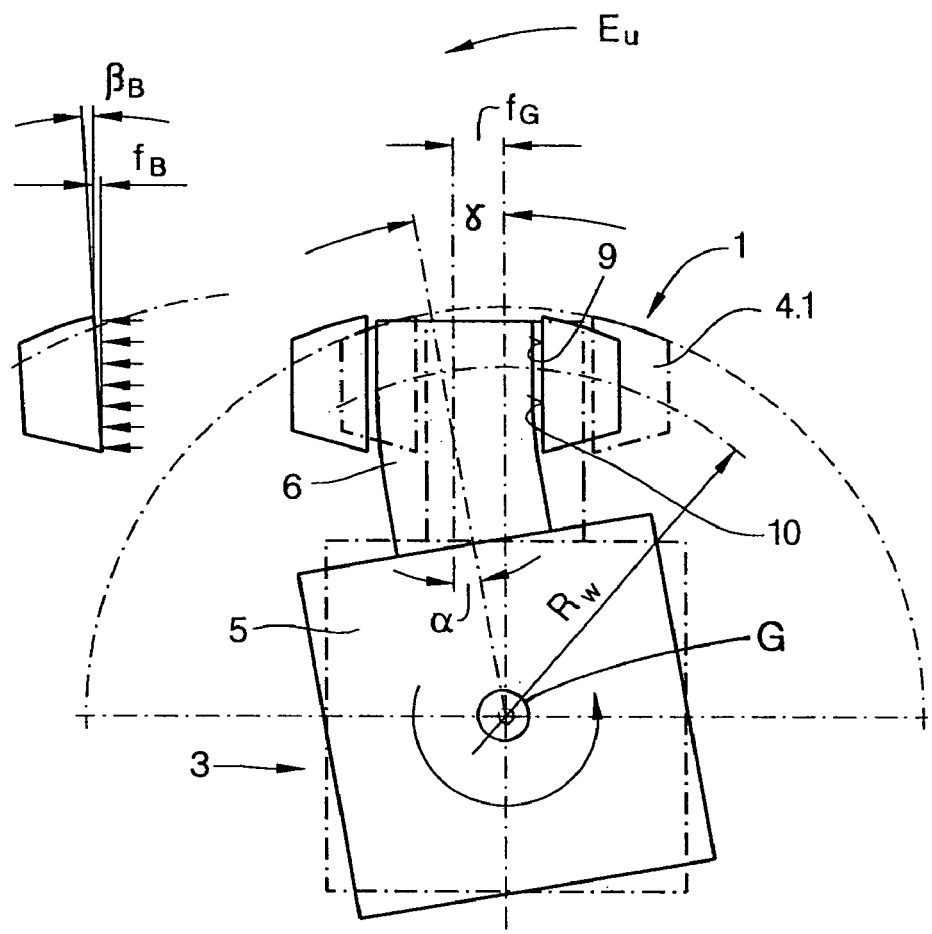
Fig.2a2
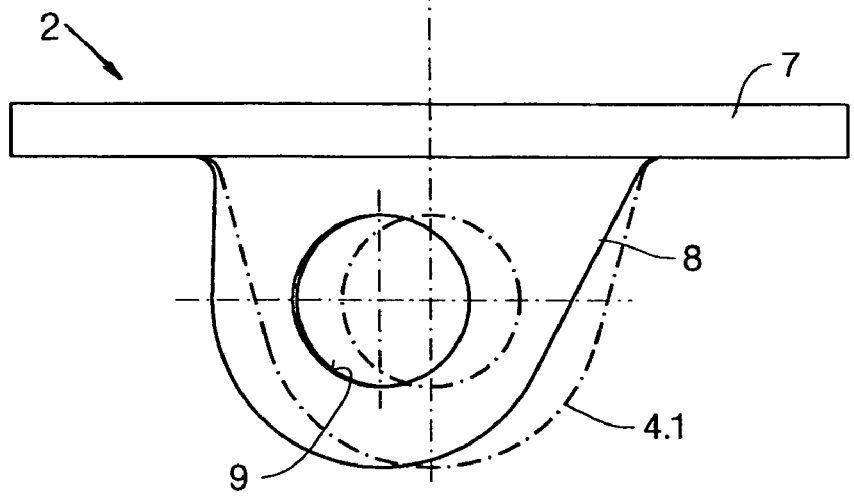

Fig.2a4
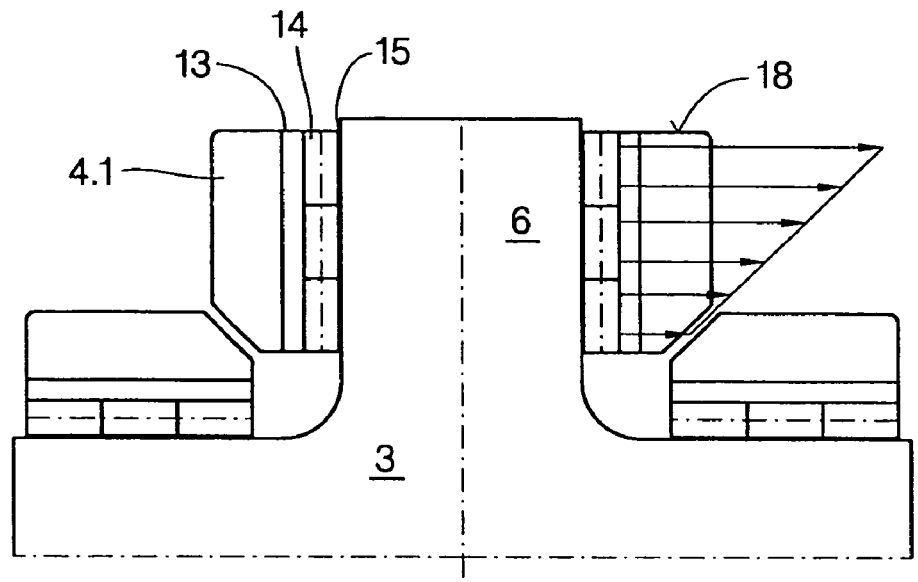
Fig.2a3
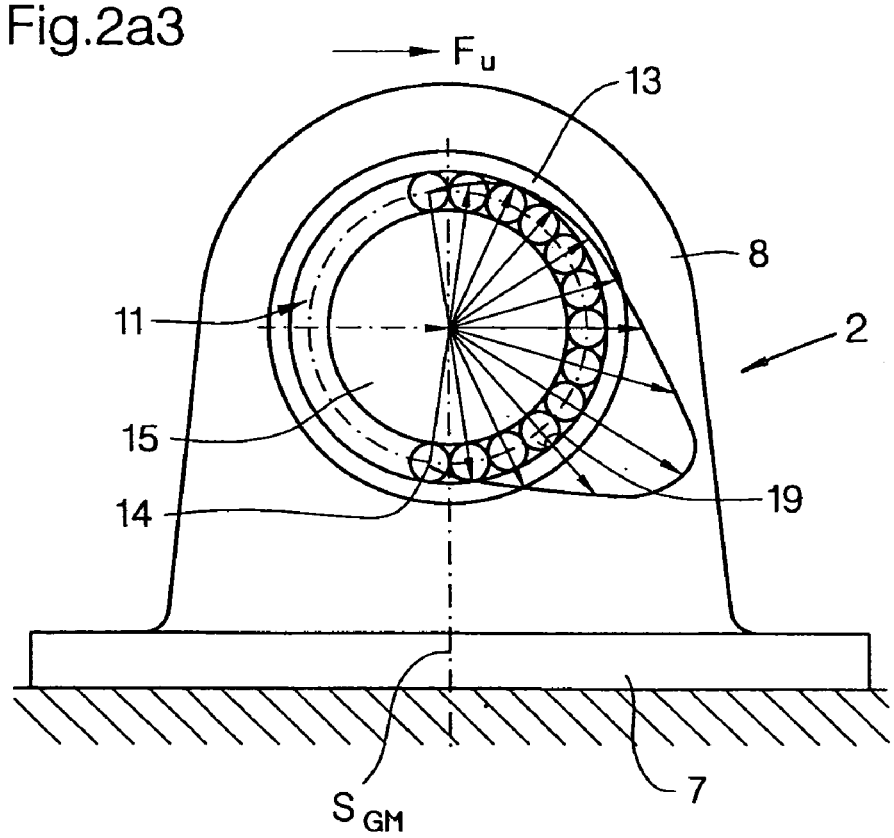

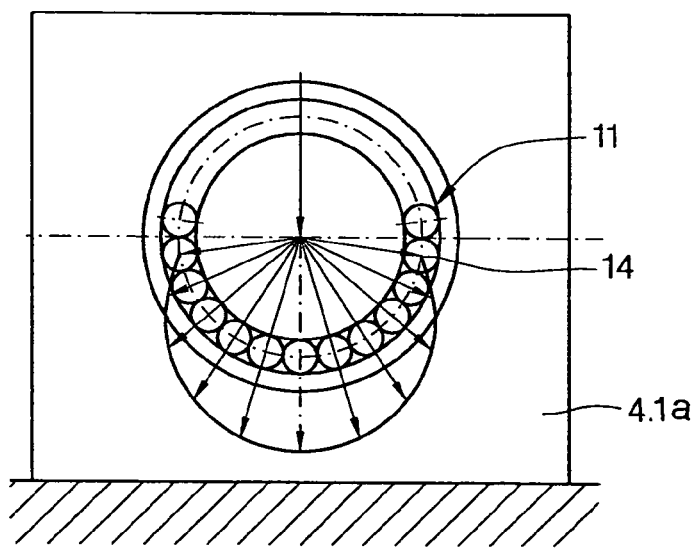
Fig.2b1
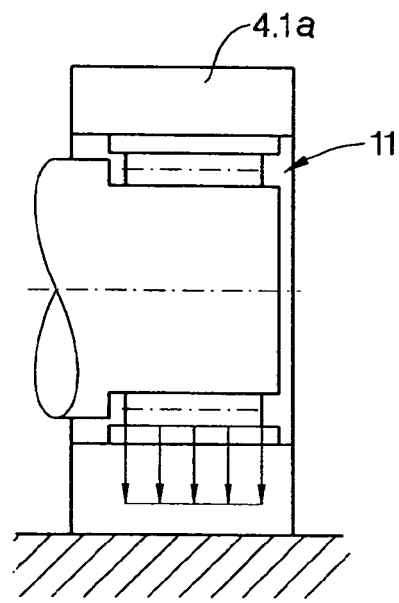
Fig.2b2

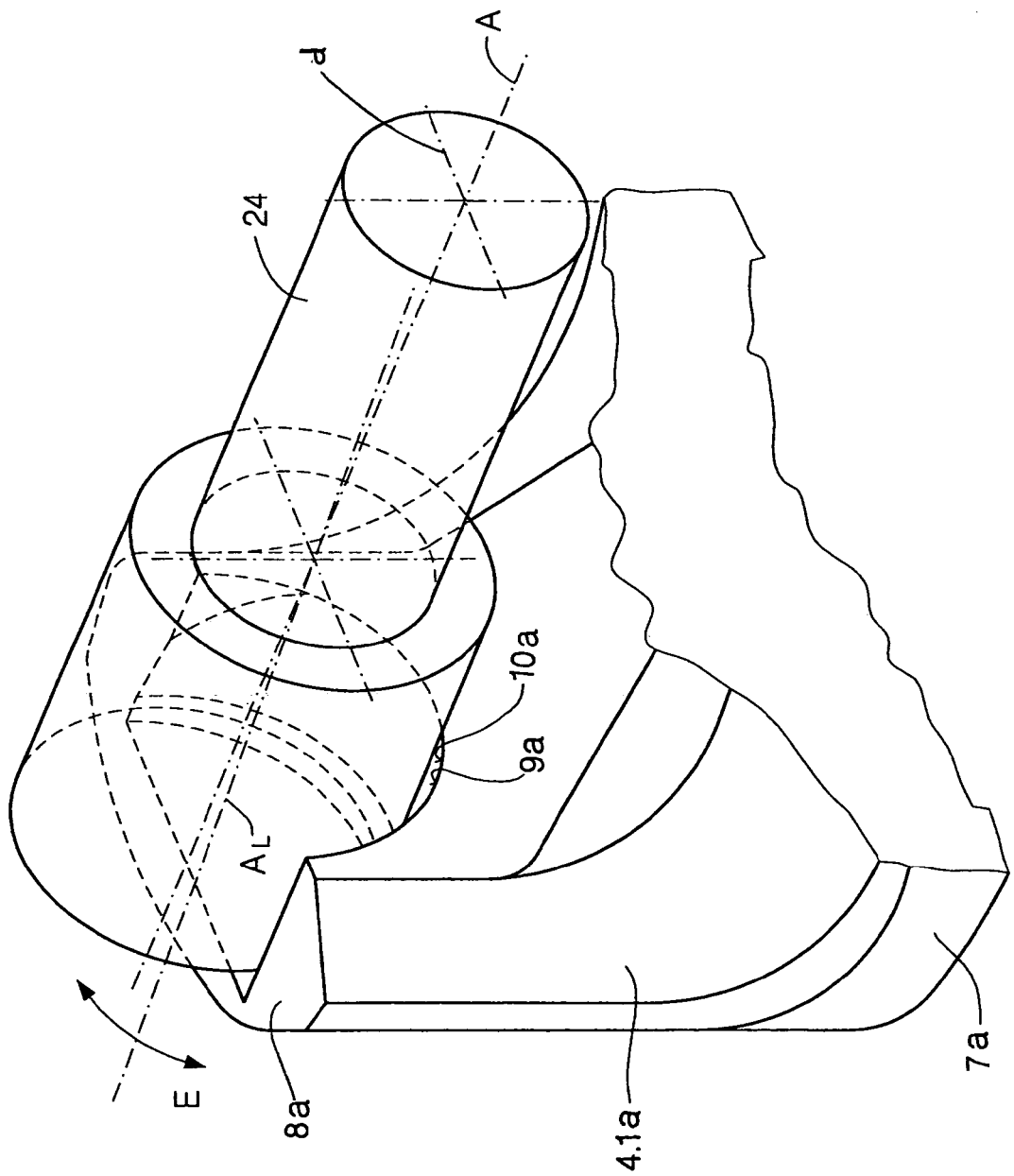

ARTICULATED YOKE, METHOD FOR THE PRODUCTION OF A SUPPORTING SURFACE ENABLING AN EVEN DISTRIBUTION AND BEARING ARRANGEMENT

FIELD OF INVENTION

The invention relates to an articulated yoke for the production of a supporting surface for the achievement of a uniform distribution of load over the rolling members of a bearing arrangement for journals of differential-pinion shafts in an articulated yoke and a bearing arrangement for mounting a journal in an articulated yoke.

BACKGROUND INFORMATION

Articulated yokes for use in universal-joint propeller shafts serve to provide the coupling between a machine element on the drive side and a machine element on the take-off side. To this end, they have at least one leg member which can be coupled to the machine element on the drive side or take-off side and bearing parts for supporting the journal of a differential-pinion shaft used for torque transmission. The articulated yoke can be in one part or a plurality of parts, preferably two parts in the form of two yoke halves, each comprising a leg member and a bearing part. Mountings for journals of differential-pinion shafts in the articulated yoke or in the individual yoke halves are known in a plurality of embodiments for a variety of examples of use. In this context, reference is made to the following representative publications:

1. Offprint, Voith, *Forschung und Konstruktion [Research and Design]*, Vol. 33 (1989, Essay 10, "Entwicklung wälzgelagerter Gelenkwellen für die Hauptantriebe schwerer Walzgerüste" ["Development of roller-mounted universal-joint propeller shafts for the main drives of heavy roll spans]")
2. DE 35 44 253 C1
3. DE 34 46 495 C2

These publications disclose embodiments of universal-joint arrangements for universal-joint propeller shafts in which, for the disposal of the differential-pinion propeller shaft in the articulated yoke, the bearing arrangement provided therefor comprises at least one radical bearing and, preferably, an axial bearing in addition. The radial bearing is designed as a roller bearing and comprises at least one inner and one outer ring, these forming the respective running tracks for the roller members. The problems of these bearing arrangements for the journals of differential-pinion shafts of universal-joint propeller shafts substantially lie in the fact that the individual roller bearings are stressed by high torque impacts and, at the same time, traverse accelerations. In such cases, the impact-like stresses with high and rapidly changing angles of bending cause elastic deformations in the articulated yoke both in the region of the leg or connecting members and within the bore of the bearing part. The bore widens and generally adopts a noncircular shape. The greatest deformation of the differential-pinion shaft is, however, caused by the introduction of circumferential force. Its direction fluctuates with the positive or negative value of the operational angle of bending and also changes with each reversing operation. These influences of operational and design factors cause alignment errors with an unfavorable distribution of load into the bearings, specifically a mismatch of the bore/oblique position of the bore, flexion of the journal, a radial play in the roller bearing and the spring deflection of the roller bearing. These problems have a particular effect with a relatively rigid bearing surround in the articulated yoke and when used in heavy universal-joint propeller shafts. The consequence thereof is a nonuniform radial pressure distribution in the bore, which leads from linear to spot contact at the contact points of the roller members of the radial bearing and to excessive edge stresses.

The greatest deformation during operation when used in universal-joint drive shafts takes place in the region of the roots of the individual journals of a differential-pinion shaft, since in this case the curvature of the line of bending analogous to the bending moment is at its greatest.

For the radial bearing, this results, under the influence of the circumferential force, in an increased stressing of the roller members in the circumferential direction in the region of the bore, which causes increased edge stresses in a segment of the radial bearing, while lifting of the rollers is observable in the opposite segment. This results in a dramatic reduction of the bearing index.

The nonuniform bearing performance also results in a nonuniform loading of the individual elements of the bearing arrangement, particularly of the running tracks. This is characterized by removal of material in the region of the highly stressed points. In order to avoid this, the running tracks have in the past been subjected to an appropriate surface treatment, which is intended very largely to avoid the adverse effects of a nonuniform introduction of load. This solution, however, is very cost-intensive. Furthermore, such a solution only allows limited use of standardized bearing arrangements for universal-joint propeller shafts.

SUMMARY OF THE INVENTION

In order to prevent the reduction of the bearing index, the individual embodiments in the above-mentioned publications propose solutions which, in terms of design embodiment, especially in terms of the interpretation of the individual structural elements, are always based on the deformation travels possibly arising, in order, by means of an actually desirable rigid bearing connection structure, to achieve a good bearing configuration and hence a long service life of the bearing. Such solutions are, however, very laborious to manufacture and hence also cost-intensive.

It is therefore an object of the present invention to provide a solution enabling the most uniform possible distribution of load over the bearing arrangement for the mounting of journals of differential-pinion shafts in articulated yokes of universal-joint propeller shafts which is characterized by a simple construction and a small number of components. Furthermore, the proposed solution is intended to be characterized by a low production engineering effort and low costs.

The articulated yoke for use in universal-joint propeller shafts comprises at least one leg member for connection to a machine element on the drive side or take-off side and at least one bearing part, with a bore for mounting a journal of a differential-pinion shaft arrangement. The bore forms a supporting surface for at least one part of a roller-bearing arrangement for mounting a journal of differential-pinion shafts. According to the invention, the supporting surface has a local recess at least in the region of the roller members of the roller-bearing arrangement that, in the mounted state, are most highly stressed during torque transmission.

The position and/or the profile of the recess is determined by the load situation, which can be characterized by at least one of the parameters listed below:

a) level of the force to be transmitted and/or
b) geometry of the bearing connection elements, especially differential-pinion shaft, articulated yoke and/or
c) deformations or deformation travels under load, in particular of the bearing connection elements articulated yoke and differential-pinion shaft and of the individual elements of the bearing arrangement, in particular roller members, and/or
d) bearing play.

As a result of the solution according to the invention, it becomes possible, during power transmission, for the radial forces to be introduced almost uniformly into the bearing arrangement by the differential-pinion shaft mounted in the articulated yoke and transmitted to the bearing connection elements, in other words the articulated yoke. The bore of the articulated yoke, which is incorporated into the bearing part of the articulated yoke, undergoes substantial relief from load here, in the region of about 40%. The individual roller members undergo virtually uniform placement on the outer running track under the influence of the circumferential force in the circumferential direction with deformation of the differential-pinion shaft, and with the influence of the circumferential force, which results in uniform rolling and hence uniform force transmission to the element bearing the outer running track and the element adjoining the latter.

The solution according to the invention is further characterized by a low design and production engineering input. The increase in service life of the bearing arrangements achievable by means of this solution, by providing a supporting surface for the uniform distribution of load on the roller members, amounts to about 40%. The abrasion otherwise caused to the outer circumference of the bearing arrangement in conventional embodiments with a parallel supporting surface is avoided by the provision of local recesses in the supporting surface, in the regions which serve to support the rolling elements or roller members that are most highly stressed, since in this region the forces acting on the supporting surface are reduced, inter alia, by deformation.

The solution according to the invention is applicable to articulated yokes which are of one-part or multipart design. In the former case, the articulated yoke comprises a leg member and two bearing parts, each having a bore. In the latter case, each yoke half comprises a leg member and a bearing part, the two yoke halves being capable of being connected in the axial and/or radial direction.

Preferably, depending on the load to be theoretically expected, the recesses in the supporting surface, viewed in the installed position and in the condition of operation during transmission of torque, are arranged in the surface regions of the supporting surface pointing in the circumferential direction.

In a further advantageous embodiment, the arrangement of the local recesses in the supporting surface is symmetrical with respect to the journal axis of the journal of a differential-pinion shaft mounted in the articulated yoke and/or symmetrical with respect to a plane which can be described by the pivot axis and the journal axis of the journal mounted in the articulated yoke. The symmetrical design of the supporting surface permits use in a universal-joint propeller shaft irrespective of the desired direction of rotation of the universal-joint propeller shaft, which in this case need not be heeded when the articulated yokes are installed.

There are a great many possible embodiments of the recesses to be provided locally in the supporting surface. The recess can be described by one or more of the parameters listed below:

a) profile of the recess parallel to the journal axis of the journal to be mounted in the articulated yoke, viewed toward the pivot axis, in a plane oriented perpendicularly to the plane described by the pivot axis and the journal axis, and/or
b) extent of the recess viewed toward the pivot axis parallel to the journal axis, and/or
c) extent of the recess viewed toward the pivot axis parallel to the journal axis in the installed position of the journal, in particular in the circumferential direction of the supporting surface, and/or
d) change in profile over the extent in the direction of the pivot axis parallel to the journal axis, and/or
e) change in direction of the extent of the recess in the circumferential direction.

The profile in turn is characterized by profile depth, profile width and shape. Preferably, profile patterns are generated that can be produced in a simple manner, if possible in one working step. In a preferred embodiment, the profile width and the profile depth diminish when viewed from the outer surface of the articulated yoke toward the pivot axis parallel to the journal axis of the journal mounted in the articulated yoke. In this embodiment, the particularly high stresses on the bearing parts disposed in the region of the outer surface of the articulated yoke are dramatically reduced.

In a further development, provision is made for the surface of the supporting surface to be subjected to a special surface treatment. This surface treatment serves to influence the mechanical properties of the structural element of the articulated yoke in the region of the bore.

According to a further aspect of the invention, provision is made for the supporting surface or one part of the supporting surface to be provided with a perforation. As a result, the supporting structure as a whole becomes elastically or plastically deformable, so that the force peaks are reduced by the work of deformation.

Preferably, an embodiment of the recess is selected which can be generated with the minimum possible working effort, in other words a small number of processing steps, from the bore that is already present. Possible working methods used here are those listed below:
  grinding
  milling
  the use of CNC spindles, for which a geometry deviating from circular geometry is programmed
  erosion, especially spark erosion
  compression
  application of coating material, for example chroming
  shaving
  perforation.

In the simplest case, the tool spindle used to generate the bore in order to generate the recess in the circumferential direction is merely inclined through a particular angle about the journal axis of the journal of a differential-pinion shaft, to be mounted in the articulated yoke, which corresponds to the theoretical median axis of the bore and the processing operation is performed again.

The solution according to the invention is, moreover, suitable for any design of articulated yokes. It is immaterial here whether the bore is of continuous form or has a closed design, meaning that the bore is merely drilled into the articulated yoke as a blind hole.

According to a further idea for a solution, the local recess is made even in the outer ring of the radial bearing in the region of the rolling elements that are most highly stressed during torque transmission.

BRIEF DESCRIPTION OF THE DRAWINGS

The solution according to the invention is explained below with reference to figures. In the figures, in detail:

FIG. 1 illustrates in a diagrammatically simplified view a yoke half designed according to the invention with a recess in the supporting surface;

FIG. 1b1 illustrates the maximum dimensions of recess 20 in terms of depth t1 and extent in the circumferential direction as width b1 along line I—I.

FIG. 1b2 illustrates the maximum dimensions of recess 20 in terms of depth t2 and extent in the circumferential direction as width b2 along line II—II.

FIGS. 2a and 2b illustrate, when compared, the problems of nonuniform stressing of the roller members during torque transmission in the circumferential direction, considered for a conventional bearing design from the prior art with running surfaces of cylindrical, in other words mutually parallel, design and the force distribution arising for use in heavy-duty universal-joint propeller shafts and the force distribution arising in the case of a bore designed according to the invention; and FIG. 3 illustrates in a diagrammatically simplified, view, with reference to a sectional view through a yoke half, a preferred method of producing the supporting structure.

DETAILED DESCRIPTION

FIGS. 2a1 to 2a4 illustrate in a diagrammatically simplified view, and not to scale, the deformations arising in the bore in the case of a conventional design of an articulated yoke with a cylindrical supporting surface, and hence the distribution of forces in the bearing arrangement. For this purpose, an extract from a universal-joint arrangement 1 for a journal bearing 2 is shown (not to scale) in the installed position in a sectional view through a differential-pinion shaft 3 mounted in the articulated yoke in a plane describable by the journal axis Z1 and perpendicular to the pivot axis G. FIGS. 2a1 and 2a2 merely illustrate here the mounting of the journal 6 of the journal arrangement 5 in a first yoke half 4.1 of the articulated yoke. The initial positions, without load, of the individual bearing connection elements, differential-pinion shaft 3 and yoke half 4.1, are illustrated here in broken lines. The continuous lines illustrate the deformations arising at the bearing connection elements, differential pinion shaft 3 and yoke half 4.1, under the influence of the circumferential force. The yoke half 4.1 comprises a leg member 7 and a bearing part 8, in which a bore 9 is disposed. The bore 9 here forms a supporting surface 10 for supporting at least part of a roller bearing arrangement, not shown here in detail, for mounting the journal 6 of the differential-pinion shaft 3 in the bore 9 of the yoke half 4.1. The effect of the oblique position $b_B$ of the bore arising because of the angle of inclination a of the journal bending line is that the individual elements of the roller-bearing arrangement, not shown here in detail, which is provided in the bore 9 for mounting the journal 6, cannot be appropriately guided parallel to one another under load, an inclination of the elements of the bearing arrangement bearing the running track and hence of the roller members, taking place. Under the influence of the circumferential force, a displacement $f_B$ of the bore 9 also occurs. The overall travel of the displacements arising is characterized by $f_G$. g in FIG. 2a indicates the total angle of twist.

The force distributions for the roller-bearing arrangement 11 resulting from these deformations illustrated are reproduced in two views in FIGS. 2a3 and 2a4. FIG. 2a3 illustrates a view in accordance with FIG. 2a2, while FIG. 2a4 again illustrates the view in accordance with FIG. 2a1 but with the roller-bearing arrangement 11 shown and an extract from the differential-pivot shaft without yoke half.

The roller-bearing arrangement 11 comprises at least one radial bearing 12, each bearing having an outer ring 13, the rolling elements 14 and an inner ring 15. The inner ring 15 here forms a first inner running surface 16 for the rolling elements 14, while the outer ring 13 forms a second outer running surface 17 for the rolling elements 14. The presence of an inner ring 15 and/or outer ring 13 is not absolutely necessary. Embodiments of the roller-bearing arrangement 11 are also conceivable in which the bearing connection elements, in detail the differential-pinion shaft 3 or journal 6 and the yoke half 4.1, function as elements supporting running tracks.

It is apparent from FIGS. 2a3 and 2a4 that, under the influence of the circumferential force, the force distribution onto the rolling elements 14 of the roller-bearing arrangement 11 is greatest in the region of the outer surface 18 of the yoke half 4.1 and in the surface regions of the supporting surface 10 that point in the circumferential direction and are here designated 19. The forces here arise from the compressive stresses acting on the supporting surface 10, which in turn are determined by the axial load, bending and radial load. The circumferential force or tangential force on the rolling elements 14 toward the supporting surface 10 is greatest in those regions which, viewed in the circumferential direction, based on the axis of symmetry $S_{GM}$ of the yoke half 4.1, which extends perpendicularly to the axis of the bore, which corresponds to the journal axis Z1 of the journal 6 of the journal arrangement 5 mounted in the bore 9, are arranged symmetrically, a lifting of the rolling elements 14 is observable. This partial contact of the rolling elements 14 on the running tracks, or on the elements forming the running tracks for the rolling elements 14, in particular on the outer ring 13 and the inner ring 15, results in a reduction of the bearing capacity of the entire roller-bearing arrangement 11. The nonuniform stresses on the bearing connection elements, in particular the bearing part 8 of the yoke half 4.1, result in corresponding fatigue phenomena in the highly stressed regions.

According to the invention, therefore, a yoke half 4.1a is provided, including a supporting surface 10a, a bearing part 8a, a leg member 7a, an outer surface 18a, an inner surface 22a, and a bore 9a. It is proposed that the supporting surface 10a, which is formed by the bore 9a, be provided with recesses 20 locally in the regions which support the most highly stressed rolling elements 14 of the roller-bearing arrangement 11. For reasons of clarification, the yoke half 4.1a is reproduced in section in the case illustrated, while the local recess 20 made in the supporting surface 10a is reproduced with double hatching. It becomes apparent from this that the local recess 20 extends substantially from the outer surface 18a of the yoke half 4.1a toward the pivot axis parallel to the journal axis Z1, preferably, as shown in FIG. 1a, over the entire extent of the bore 9a in the direction parallel to the journal axis Z1. Furthermore, the recess 20 extends in the circumferential direction, in other words in the radial direction based on the journal axis Z1 viewed on the bore 9a. The extent in the circumferential direction occurs here via the extent of different size toward the pivot axis parallel to the journal axis Z1. In accordance with the load arising according to FIGS. 2a3 and 2a4 in a conventional embodiment with cylindrical bore 9, the recess 20 as illustrated in FIGS. 1b-1 and 1b-2 possesses the maximum dimensions in terms of depth t1 and t2 respectively, and extent in the circumferential direction, here designated as width b1 and b2 respectively, in the region of the outer surface 18a of the yoke half 4.1a in the bore 9a. These diminish here in the direction of the pivot axis, as can be seen at line II—II as illustrated in FIG. 1b-2. These dimensions diminish here in the direction of the pivot axis. The force distribution achievable in the bore with this supporting structure is shown in FIGS. 2b1 and 2b2.

FIGS. 1b-1 and 1b-2 illustrates the respective cross sectional views along lines I—I and II—II. If contrasted with one another, the change in the profile pattern of the recess 20 toward the pivot axis G parallel to the journal axis Z1 starting from the outer surface 18a of the yoke half 4.1a is apparent. It becomes apparent from this that the profile width b1 and the profile depth t1 as illustrated in FIG. 1b-1 are designed to be much greater in the region of the outer surface 18a of the yoke half 4.1a than in the region of the inner surface 22a of the yoke half 4.1a as illustrated by FIG. 1b-2. These dimensions in this region are designated b2 and t2.

The embodiment of a recess 20 shown in FIGS. 1a and 1b represents a preferred design. The solution according to the invention is not, however, tied to this embodiment. Modifications are conceivable in the presentation of the profile, especially as regards the shape of the profile of the recess and/or the design of the profile in respect of its width, depth and length, in other words its extent in the direction of the pivot axis G parallel to the journal axis Z1 of the journal mounted in the yoke half 4.1a. The specific design of the recess 20 depends here on the specific individual case and is left to the discretion of the responsible person skilled in the art. The size of the local recess in the supporting surface is determined here by at least one of the parameters listed below, but preferably the combination of the individual parameters:

level of the force to be transmitted geometry of the bearing connection elements, bearing housing or yoke half and differential-pinion shaft deformation of the bearing connection elements under load, especially of the yoke half, the differential-pinion shaft and the rolling elements or the elements bearing the running surfaces for the rolling elements bearing play.

The solution according to the invention of providing local recesses in the supporting surface of the bore differs substantially here from the precise bore or circular geometry normally required. The profile of the recess cut into the supporting surface covers in this case about ¹⁄₁₀ to ⁵⁄₁₀ of the supporting surface. The specific position, viewed in the circumferential direction of the bore, and the specific design of the profile as regards shape, depth, breadth and length are determined by the load situation, which can be described by the parameters listed above.

In accordance with another exemplary articulated yoke of the present invention, the recesses 20 are arranged symmetrically relative to a plane, which is described by the journal axis of the journal 6, mounted in the articulated yoke, of a differential-pinion shaft 3 and the pivot axis G.

In accordance with still another exemplary articulated yoke of the present invention, the supporting surface 10a and/or the surface of the supporting surface 10a that can be described by the recess 20 are surface-treated.

In accordance with yet another exemplary articulated yoke of the present invention, the supporting surface 10a and/or recess 20 are provided with a perforation.

In accordance with still another exemplary articulated yoke of the present invention, the recess 20 is treated by percussion compression.

In accordance with an exemplary articulated yoke of the present invention, the bore 9a is designed as a blind hole.

FIG. 3 illustrates, in a diagrammatically simplified view with reference to an extract from a yoke half 4.1a, which is reproduced in sectional view, the interaction with a tool spindle 24 for machining the bore 9a, especially the supporting surface 10a for incorporating the recesses 20 to be provided according to the invention. The incorporation of the recesses 20 takes place here by the interaction of a tool spindle 24 with the bore 9a. The tool spindle 24 has a diameter d which corresponds to the diameter of the bore. The bore can also be already cut into the yoke half 4.1a with this tool spindle 24. The cutting of the bore takes place here by guiding the tool spindle 24 with its axis A corresponding to the bearing axis or median axis $A_L$ theoretically appropriate for the cylindrical embodiment of the bore 9a, which corresponds to the journal axis Z1 of the journal mounted in the articulated yoke. The incorporation of the recess 20 into the support surface 10a which is formed by the bore 9a then takes place by inclining the axis of the tool spindle 24 relative to the theoretical median axis of the bore 9a which, in the installed position of the journal, corresponds to the journal axis Z1 of the journal mounted in the articulated yoke. The angle of inclination E here indicates the position and size of the recess 20 produced in the supporting surface 10a of the bore 9a, in accordance with the size and direction of the angle of inclination E based on a plane, which can be described by the journal axis Z1 of the journal, which is theoretically mounted in the yoke half 4.1a, and the pivot axis G, which corresponds to the axis of symmetry or axis of rotation of the universal-joint propeller shaft. The angle of inclination E also indicates the improvement in the force distribution in the roller-bearing arrangement under load as compared with a conventionally designed bearing arrangement, in particular a bore 9a with a cylindrical supporting surface.

Preferably, the remachining of the bore 9a is done by milling. Other methods of machining are, however, also conceivable, such as, for example grinding, erosion, compression, especially percussion compression, shaving and perforation, it being possible in the last-named case for the supporting structure to be designed to be elastically or plastically deformable by means of the provision of a perforation.

What is claimed is:

1. An articulated yoke of a universal-joint propeller shaft, the propeller shaft having a drive side and a take-off side, the articulated yoke comprising:

at least one leg member configured to couple to a machine element on at least one of the drive side and the take-off side of the universal-joint propeller shaft;

at least one bearing part connected to the leg member, the bearing part including a supporting surface defining a bore therethrough; and a roller-bearing arrangement to position a journal of a differential-pinion shaft, the roller-bearing arrangement having a plurality of rolling elements configured to enable rotation of the journal about a longitudinal axis of the journal with respect to the supporting surface, the roller-bearing arrangement having at least one region of stress adjacent to the journal at which the journal exerts a radial force capable of elastically or plastically deforming the bearing part or the roller-bearing arrangement, the supporting surface configured to support at least a portion of the roller-bearing arrangement;

wherein the supporting surface of the bearing part is provided with at least one recess in the region of stress the recess including a width in a direction around the journal, a depth in a direction radial of the journal, and a direction of extension extending toward a pivot axis of the journal in a direction parallel to the longitudinal axis of the journal, the width and the depth of the recess diminishing along the direction of extension, such that the recess accommodates deformation of the roller-bearing arrangement in the direction of the radial force to maintain a substantially uniform distribution of radial forces transmitted by the journal to the roller-bearing arrangement.

2. The articulated yoke according to claim 1, wherein the recesses extends an entire length of the bore.

3. The articulated yoke according to claim 1, wherein the supporting surface of the bearing part further includes a second recess in a second region of stress, the second recess being arranged symmetrically relative to a plane described by the longitudinal axis of the journal and the pivot axis of the journal.

4. The articulated yoke according to claim 1, further comprising:
two yoke halves having respective leg members and bearing parts.

5. The articulated yoke according to claim 1, wherein the bore comprises a blind hole.

6. A bearing arrangement to position a differential-pinion shaft in an articulated yoke of a universal-joint propeller shaft, comprising:
at least one bearing part including a supporting surface defining a bore therethrough; and
a roller-bearing arrangement to position a journal of a differential-pinion shaft, the roller-bearing arrangement having a plurality of rolling elements configured to enable rotation of the journal about a longitudinal axis of the journal with respect to the supporting surface, the roller-bearing arrangement having at least one region of stress adjacent to the journal, at which the journal exerts an excess radial force capable of elastically or plastically deforming the bearing part or the roller-bearing arrangement, the supporting surface configured to support at least a portion of the roller-bearing arrangement;
wherein the supporting surface of the bearing part is provided with at least one recess in the region of stress, the recess including a width in a direction around the journal, a depth in a direction radial of the journal, and a direction of extension extending toward a pivot axis of the journal in a direction parallel to the longitudinal axis of the journal, the width and the depth of the recess diminishing along the direction of extension, such that the recess accommodates deformation of the roller-bearing arrangement in the direction of the radial force to maintain a substantially uniform distribution of radial forces transmitted by the journal to the roller-bearing arrangement.

7. The bearing arrangement according to claim 6, wherein the recess extends an entire length of the bore.

8. The bearing arrangement according to claim 6, wherein the supporting surface of the bearing part further includes a second recess in a second region of stress, the second recess being arranged symmetrically relative to a plane described by the longitudinal axis of the journal and the pivot axis of the journal.

9. An articulated yoke of a universal-joint propeller shaft, the propeller shaft having a drive side and a take-off side, the articulated yoke comprising:
at least one leg member configured to couple to a machine element on at least one of the drive side and the take-off side of the universal-joint propeller shaft;
at least one bearing part connected to the leg member, the bearing part including a supporting surface defining a bore therethrough; and
a roller-bearing arrangement to position a journal of a differential-pinion shaft, the roller-bearing arrangement having a plurality of rolling elements configured to enable rotation of the journal about a longitudinal axis of the journal with respect to the supporting surface, the roller-bearing arrangement having a first region of stress adjacent to the journal, at which the journal exerts a radial force capable of elastically or plastically deforming the bearing part or the roller-bearing arrangement the supporting surface configured to support at least a portion of the roller-bearing arrangement;
wherein the supporting surface of the bearing part is provided with a recess over the entire first region of stress, the recess including a width in a direction around the journal, a depth in a direction radial of the journal, and a direction of extension extending toward a pivot axis of the journal in a direction parallel to the longitudinal axis of the journal, the width and the depth of the recess diminishing along the direction of extension, such that the recess accommodates deformation of the roller-bearing arrangement in the direction of the radial force to maintain a substantially uniform distribution of radial forces transmitted by the journal to the roller-bearing arrangement.

10. The articulated yoke according to claim 9, wherein the recess extends an entire length of the bore.

11. The articulated yoke according to claim 9, wherein the supporting surface of the bearing part further includes a second recess in a second region of stress, the second recess being arranged symmetrically relative to a plane described by the longitudinal axis of the journal and the pivot axis of the journal.

12. The articulated yoke according to claim 9, further comprising:
two yoke halves having respective leg members and bearing parts.

13. The articulated yoke according to claim 9, wherein the bore comprises a blind hole.

* * * * *